3,527,829
PROCESS FOR PRODUCING HIGH-PURITY
ISOBUTYLENE
Tatuo Horie, Tokyo, and Yasuo Fujiwara, Yokohama, Kanagawa, Japan, assignors to Nippon Oil Company, Limited, Tokyo, Japan
No Drawing. Filed May 1, 1967, Ser. No. 634,836
Claims priority, application Japan, May 12, 1966, 41/29,700
Int. Cl. C07c 11/102
U.S. Cl. 260—677     6 Claims

ABSTRACT OF THE DISCLOSURE

This invention relates to a process for producing high-purity isobutylene which comprises bringing a mixture of hydrocarbons containing isobutylene into contact with a catalyst solution comprising 6.0 to 14.0 mol percent of zinc chloride, 4.0 to 11.0 mol percent of hydrogen chloride, 80.0 to 86.0 mol percent of water and, if desired, at least one of trivalent iron ions and tetravalent titanium ions, thereby selectively converting isobutylene into corresponding tertiary butyl alcohol, degassing the resulting catalyst solution at an elevated temperature to such an extent that no vigorous dehydration of tertiary butyl alcohol to regenerate isobutylene occurs, and thereafter, conducting the dehydration reaction of tertiary butyl alcohol thereby recovering high-purity isobutylene therefrom.

BACKGROUND OF THE INVENTION

Field of the invention

This invention relates to a process for separating and recovering high-purity isobutylene from a hydrocarbon mixture containing isobutylene by using Friedel-Crafts catalyst composition comprising zinc chloride, hydrochloric acid and water.

Description of the prior art

As the processes for separating and recovering isobutylene from a mixture of hydrocarbons having four carbon atoms on the industrial scale, so-called "Esso Process" using 65% sulfuric acid and "CFR-Badger Process" using 50% sulfuric acid are known well heretofore. However, according to the accessible information, the purity of isobutylene produced according to these prior processes is about 99.0% at the most. Moreover, since sulfuric acid is used as an extracting agent in these processes, the polymerization reaction of isobutylene is almost inevitable, thus the yield of isobutylene recovered is as low as below 90%.

SUMMARY OF THE INVENTION

An object of this invention is to provide a process for producing isobutylene having a purity of higher than 99.9% which is hardly obtainable with the use of catalyst compositions known heretofore, with an increased yield of higher than 95%, while repressing the polymerization reaction of isobutylene to the minimum on the industrial scale.

Said object may now be accomplished according to the process of this invention, which comprises a combination of the following three stages, (1) a hydration stage wherein a mixture of hydrocarbons containing isobutylene is brought into contact with a catalyst solution in a liquid-liquid phase under a vapor pressure of the mixture of hydrocarbons at the reaction temperature thereby converting only isobutylene contained therein into tertiary butyl alcohol and the resulting tertiary butyl alcohol is selectively extracted with the catalyst solution, (2) a degassing stage wherein the catalyst solution containing thus extracted tertiary butyl alcohol is heated to such an extent that the dehydration of the tertiary butyl alcohol to regenerate isobutylene does not vigorously occur, i.e. only a part of the tertiary butyl alcohol is converted into isobutylene, thereby removing hydrocarbon impurities other than isobutylene dissolved in the catalyst solution therefrom, and (3) a dehydration stage wherein the degassed catalyst solution is heated to effect a dehydration reaction of tertiary butyl alcohol to regenerate isobutylene.

The catalyst solution which may be used in the process of this invention is composed of three ingredients, i.e. zinc chloride, hydrogen chloride and water, and the proportions of these ingredients used greatly affect the hydration of isobutylene to form tertiary butyl alcohol and the dehydration of the tertiary butyl alcohol to regenerate isobutylene in the process of this invention. More specifically, in the hydration reaction, a higher concentration of zinc chloride in the catalyst solution leads to a remarkable polymerization of isobutylene, while a higher concentration of hydrogen chloride results in the formation of more amount of chlorides of isobutylene. On the other hand, in a region where the concentration of zinc chloride or hydrogen chloride is low, the rate of hydration of isobutylene is so low that the process becomes impractical.

It has now been found that there is a certain specific mixing proportion of these three ingredients to obtain an optimum catalyst composition which permits to avoid undesirable side-reactions such as polymerization, addition of hydrogen chloride, and to give a practical rate of reaction suitable for industrial use.

An optimum composition for catalyst solution which may be used in the process of this invention is 6.0 to 14.0 mol percent of zinc chloride, 4.0 to 11.0 mol percent of hydrogen chloride, and 80.0 to 86.0 mol percent of water.

By carrying out the hydration reaction of isobutylene in the presence of a catalyst solution having a proportion within a range specified above, isobutylene can be smoothly hydrated in a stable manner without causing formation of precipitates in catalyst solution, coloration, and substantially free from polymerization and hydrogen chloride addition reactions.

However, if the proportion of even one ingredient of the catalyst solution is outside the optimum range mentioned above, the desired result may not be obtained. For example, when isobutylene is extracted from a mixture of hydrocarbons having four carbon atoms at 25° C. with a catalyst solution comprising 12 mol percent of zinc chloride, 12 mol percent of hydrogen chloride and 76 mol percent of water, some 40% of isobutylene supplied is converted to an oily matter consisting of tertiary butyl chloride, isobutylene dimers and trimers and others, and the degree of isobutylene extraction is only 60%.

Furthermore, if the same reaction is carried out in the presence of a catalyst solution comprising 5 mol percent of zinc chloride, 3 mol percent of hydrogen chloride and 92 mol percent of water, only 10 percent of isobutylene supplied is extracted even after carrying out the reaction for 10 hours although the formation of oily matter is not observed at all. On the contrary, when the reaction is carried out in the presence of a catalyst solution having a composition within the optimum range at 25° C., the reaction reaches an equilibrium in less than 1 hour and the yield of by-product is as low as below 5% based on isobutylene supplied.

It is advantageous to carry out the hydration reaction at a temperature as high as possible because of the resulting greater reaction rate. However, if the reaction is carried out at excessively high temperatures, n-butylenes would also be hydrated in addition to isobutylene and thus the selectivity of reaction lowers.

One of the features of the process of this invention resides in that the hydration reaction can be effected even at a low temperature, e.g. 0°–50° C., at a reaction rate as high as that of CFR-Badger Process mentioned above, without accompanying decrease in the selectivity of hydration. Another notable feature of the process of this invention resides in that even if a great amount of butadiene is contained in a mixture of hydrocarbons containing isobutylene which is used as a starting material, only isobutylene can be absorbed selectively therefrom without absorbing butadiene by carrying out the hydration reaction at such low temperature as mentioned above.

After the hydration reaction, the catalyst solution contains a considerable amount of hydrocarbons other than isobutylene dissolved therein in the hydration stage, in addition to tertiary butyl alcohol obtained by the hydration of isobutylene. Thus, if the resulting solution obtained from hydration stage is subjected to subsequent dehydration reaction as it is, most of these impurities are carried over into the regenerated isobutylene causing decrease in purity of the recovered isobutylene and the value of isobutylene as a material for various organic synthesis is greatly degraded.

It has been found that the purity of isobutylene obtained in the process mentioned above may be greatly improved by eliminating the impurities of hydrocarbons dissolted in the catalyst solution therefrom by way of degassing after the hydration stage and prior to the dehydration stage.

The hydration reaction in the process of this invention is effected by way of a liquid-liquid contact of a mixture of hydrocarbons with the catalyst solution under a reaction pressure corresponding to an autogenous vapor pressure of these hydrocarbons at a reaction temperature employed.

In view of the fact that the dehydration reaction is usually carried out under normal pressure, a part of impurities of hydrocarbons that are physically dissolved in the catalyst solution may be removed by reverting the pressure of the reaction system in the hydration stage to normal pressure without providing a special degassing stage. However, mere reversion of the pressure of the reaction system in the hydration stage to normal is not sufficient for a complete removal of the dissolved impurities of hydrocarbon due to the existence of a great amount of tertiary butyl alcohol in the catalyst solution. Thus, even if assuming that no hydrocarbon other than isobutylene is absorbed chemically in the hydration stage under normal operating conditions, the purity of isobutylene recovered from the dehydration process will not exceed an order of about 98%, thereby giving a product insufficient quality for various organic syntheses.

In order to remove impurities of hydrocarbons which are still remaining under normal pressure to enhance the purity of isobutylene recovered, there are proposed various methods such as treatment under highly reduced pressure, solvent extraction by which the dissolved impurities are removed, stripping of impurities by blowing an inert gas other than hydrocarbons, but they are not regarded as advantageous methods from the economical and operational points of view.

We have succeeded in producing isobutylene having a purity as high as 99.9% by incorporating a degassing stage between hydration and dehydration stages. In the degassing stage, the catalyst solution from the hydration stage suitably heated at an elevated temperature serves to lower the solubility of hydrocarbon impurities. Also, the dissolved hydrocarbon impurities are stripped with isobutylene gas produced by dehydration of tertiary butyl alcohol that partly concurs.

It has now been found that the operation temperature is important in the degassing process to afford a satisfactory result, that is, an optimum degassing temperature ranges from 60° to 70° C.

If the temperature is lower than the range specified above, it is hardly possible to obtain the effects mentioned above, while a higher temperature leads to a predominant concurrence of the dehydration of tertiary butyl alcohol to form isobutylene, and as a result, the recovery and recycle operations of the produced isobutylene incurs additional expense, thus, it is undesirable.

A small amount of isobutylene produced in the degassing process can be recycled to the hydration stage as it is, thus, no loss results therefrom. The conventional sulfuric acid processes known heretofore is incapable of enhancing the purity of produced isobutylene in such a simple operation as in the present process due to the greater affinity of sulfuric acid with hydrocarbon impurities, and necessitates the more complicated operations.

Equipments which may be employed in the degassing process of this invention are provided with heating means, an inlet and outlet for catalyst solution and an exit for gas, and, for example, either a vessel provided with a stirrer or a packed tower may be conveniently used as a reactor. The process of this invention may be carried out either in a batch method or a continuous method.

The zinc chloride solution in aqueous hydrochloric acid used in the process of this invention is highly corrosive to metals normally used for chemical equipments. It has been found that titanium has excellent properties as a construction material of which the vessel containing said zinc chloride solution is made. However, in spite of the fact that titanium has a sufficient corrosion resistance to the catalyst solution at temperatures below 90° C. used in the hydration and degassing processes of this invention, a corrosion of titanium begins to prevail at temperatures of from 90° C. to the boiling point of the catalyst solution.

We have now found that the corrosion resistance of titanium at high temperature can be remarkably increased by adding small amounts of both trivalent iron ions and tetravalent titanium ions to the catalyst solution with a result that any important corrosion of titanium is not observed for a prolonged period of time even its contact with boiling catalyst solution.

The addition of both of these ions to the catalyst solution produces significant synergistic effect, although the corrosion resistance of titanium may be fairly improved by the addition of either one of trivalent iron ions or tetravalent titanium ions to the catalyst solution, respectively.

The addition of the excessively small amounts of these iron ions and titanium ions produces practically no increase in corrosion resistance of titanium, while the addition of excessively large amounts lead to the undesirable phenomena such as the formation of precipitates, oxidation of organic compounds which are present in the reaction system.

Hence, there is a specific optimum range for the concentrations of these ions in order to obtain a satisfactory result and it has been found that a concentration of trivalent iron ion of from 10 to 100 millimoles, and that of tetravalent titanium ion of from 4 to 15 millimoles per liter of catalyst solution afford the best corrosion resistance. In the process of this invention these ion and titanium ions mentioned above may be trivalent or tetravalent under the reaction conditions. That is, although these ions are usually added to the catalyst solution in the forms of inorganic salts, they are not necessarily required to be trivalent or tetravalent. For example, as for iron ions, it may be added in the form of bivalent salt so long as it may be oxidized to trivalent by a suitable oxidizing agent.

The dehydration reaction of producing high-purity isobutylene according to this invention is carried out by heating the catalyst solution containing tertiary butyl alcohol which is obtained from the degassing process in a reactor provided with a mixer, a plate tower or a packed tower thereby separating and recovering high-purity isobutylene in a high yield. It is very advantageous from the industrial point of view that the dehydration reaction which involves the highest temperature in the process of this invention may be practised without accompanying any corrosion of equipment and the hydration, degassing and dehydration stages may be carried out smoothly free from any inconveniences by the addition of iron and titanium ions to the catalyst solution.

In summary, the process of this invention enables the production of isobutylene having an extremely high purity which is hardly obtainable in the prior art processes from $C_4$ hydrocarbon fraction on an industrial scale by a combination of zinc chloride solution in aqueous hydrochloric acid having a certain specific composition as a catalyst, a degassing stage and, if desired an addition of both of iron and titanium ions to the catalyst solution to improve the corrosion resistance of equipments employed.

DESCRIPTION OF THE PREFERRED EMBODIMENTS

The following examples will illustrate the process of this invention more fully. However, it should not be construed that these examples restrict this invention since they are given merely by way of illustration.

EXAMPLE 1

To a solution of zinc chloride in aqueous hydrochloric acid containing 4.0 moles/l. of zinc chloride and 4.0 moles/l. of hydrogen chloride, and having a composition of 8.2 mol percent of zinc chloride, 8.2 mol percent of hydrogen chloride and 83.6 mol percent of water, were added 20 millimoles/l. of ferric chloride and 5 millimoles/l. of titanium tetrachloride to make a catalyst solution. To a 5 liters pressure-resistant reactor made of titanium having a purity of 99.5% and provided with a stirrer was charged 1.5 liters of the resulting catalyst solution and 1.5 liters of $C_4$ liquid fraction having a composition as shown in the following Table 1 which was obtained by a thermal cracking of naphtha was added thereto and the hydration reaction was carried out at 35° C. for 30 minutes with vigorous stirring by bringing a layer of hydrocarbons into intimate contact with a layer of catalyst solution.

TABLE 1.—COMPOSITION OF STARTING $C_4$ FRACTION (MOL PERCENT)

| | |
|---|---|
| Propane, propylene | Trace |
| Isobutane | 1.9 |
| N-butane | 9.0 |
| Trans-butene-2 | 10.0 |
| Cis-butene-2 | 7.8 |
| Isobutylene | 44.9 |
| Butene-1 | 25.2 |
| 1,3-butadiene | 0.7 |
| $C_5$ fraction | 0.5 |
| Fraction above $C_6$ | Trace |

After the completion of the reaction, stirring was terminated and the reaction mixture was allowed to stand still to give a layer of $C_4$ fraction from which isobutylene was extracted and a layer of catalyst solution containing alcohols. Gas chromatographic analysis of the $C_4$ fraction revealed that 94.0% of isobutylene was extracted with the catalyst solution.

The layer of catalyst solution was separated under pressure, and then, to a degassing reactor made of titanium provided with a stirrer and having a shape similar to that of hydration vessel was charged the layer of catalyst solution of which pressure was reverted to normal, and the degassing was carried out at 63° C. for 30 minutes. As a result, isobutylene gas having a purity of 83.6% was discharged from the degassing reactor. Isobutylene thus obtained corresponded to 10.5% based on the amount of isobutylene absorbed in the catalyst solution in the hydration process. Subsequently, the catalyst solution from the degassing operation was fed to a top of dehydration tower made of titanium and having an inner diameter of 25 mm. and 60 perforated plates continuously over 60 minutes, and a dehydration reaction was carried out under conditions including a top temperature of −6° C. and a bottom temperature of 105° C. As a result, isobutylene having a purity of 99.93% based on hydrocarbons was obtained from the top of dehydration tower.

The recovering yield of the high-purity isobutylene was 99.3% based on isobutylene charged to the dehydration tower.

The formation of polymer was not observed by an analysis by highly sensitive hydrogen flame ionized gas chromatography.

TABLE 2.—IMPURITIES IN RECOVERED HIGH-PURITY ISOBUTYLENE

| | Mol p.p.m. |
|---|---|
| Fraction below $C_3$ | 0 |
| Isobutane | 64 |
| N-butane | 137 |
| Trans-butene-2 | 118 |
| Cis-butene-2 | 100 |
| Butene-1 | 200 |
| 1,3-butadiene | 0 |
| $C_5$ fraction | 27 |
| Fraction above $C_6$ | 0 |

The hydration, degassing and dehydration reactions were repeatedly carried out. Corrosion of titanium at the bottom of the dehydration tower was minimal, i.e. 0.001 cm./year, even after a total dehydration reaction time of 620 hours.

The corrosion of titanium in the hydration and degassing equipments were less than 0.0001 cm./year.

The experiments were repeated by using a glass reactor and 50% sulfuric acid as a catalyst solution. The purity of the recovered isobutylene was 99.3% and the purity was not improved, even the degassing temperature was raised to 70° C.

We claim:

1. A process for producing high purity isobutylene which comprises contacting a mixture of hydrocarbons containing isobutylene with an aqueous catalyst solution comprising 6.0 to 14.0 mol percent of zinc chloride, 4.0 to 11.0 mol percent of hydrogen chloride and 80.0 to 86.0 mol percent of water at a temperature of from 0° C. to 50° C., thereby selectively converting isobutylene into the corresponding tertiary butyl alcohol, separating the reaction mixture into a hydrocarbon layer and an aqueous layer, treating the aqueous layer at an elevated temperature of from 60° C. to 70° C., whereby unconverted hydrocarbons dissolved in the aqueous layer are separated from said aqueous layer without substantive dehydration of tertiary butyl alcohol to isobutylene, and thereafter, treating the degassed aqueous layer at a temperature in excess of 70° C. to dehydrate the tertiary butyl alcohol to isobutylene, and recovering the isobutylene from the products of dehydration.

2. A process according to claim 1 wherein said catalyst solution consists essentially of 6.0 to 14.0 mol percent of zinc chloride, 4.0 to 11.0 mol percent of hydrogen chloride and 80.0 to 86.0 mol percent of water.

3. A process according to claim 1 wherein the recovered isobutylene has a purity greater than 99.9% in a yield greater than 95% based upon the isobutylene content of the starting mixture.

4. A process according to claim 1 wherein the pressure in the first conversion step is conducted under a reaction pressure corresponding to the autogenous vapor pressure of the hydrocarbon mixture at the reaction temperature.

5. A process according to claim 1 wherein said mixture of hydrocarbons comprises a $C_4$ liquid fraction from the thermal cracking of naphtha.

6. A process for producing high purity isobutylene which comprises contacting a mixture of hydrocarbons containing isobutylene with an aqueous catalyst solution comprising 6.0 to 14.0 mol percent of zinc chloride, 4.0 to 11.0 mol percent of hydrogen chloride, an additive selected from the group consisting of from 10 to 100 millimols of trivalent iron ions or from 4 to 15 millimols of tetravalent titanium ions per liter of said catalyst solution, and 80.0 to 86.0 mol percent of water at a temperature of from 0° C. to 50° C., thereby selectively converting isobutylene into the corresponding tertiary butyl alcohol, separating the reaction mixture into a hydrocarbon layer and an aqueous layer, treating the aqueous layer at an elevated temperature of from 60° C. to 70° C., whereby unconverted hydrocarbons dissolved in the aqueous layer are separated from said aqueous layer without substantive dehydration of tertiary butyl alcohol to isobutylene, and thereafter, treating the degassed aqueous layer at a temperature in excess of 70° C. to dehydrate the tertiary butyl alcohol to isobutylene, and recovering the isobutylene from the products of dehydration.

References Cited

UNITED STATES PATENTS

| | | | |
|---|---|---|---|
| 2,012,785 | 8/1935 | Deanesly et al. | 260—170 |
| 2,109,004 | 2/1938 | Archibald et al. | 260—156 |
| 3,355,501 | 11/1967 | Biller | 260—614 |
| 3,397,250 | 8/1968 | Nambu | 260—677 |

FOREIGN PATENTS 493,884 10/1938 Great Britain.

DELBERT E. GANTZ, Primary Examiner

J. M. NELSON, Assistant Examiner

U.S. Cl. X.R.

260—640